July 2, 1929. W. B. PEIRCE 1,719,446
METAL WORKING MACHINERY
Filed Feb. 25, 1927 5 Sheets-Sheet 1

Inventor
William B. Peirce
by George C. Dean
his Atty

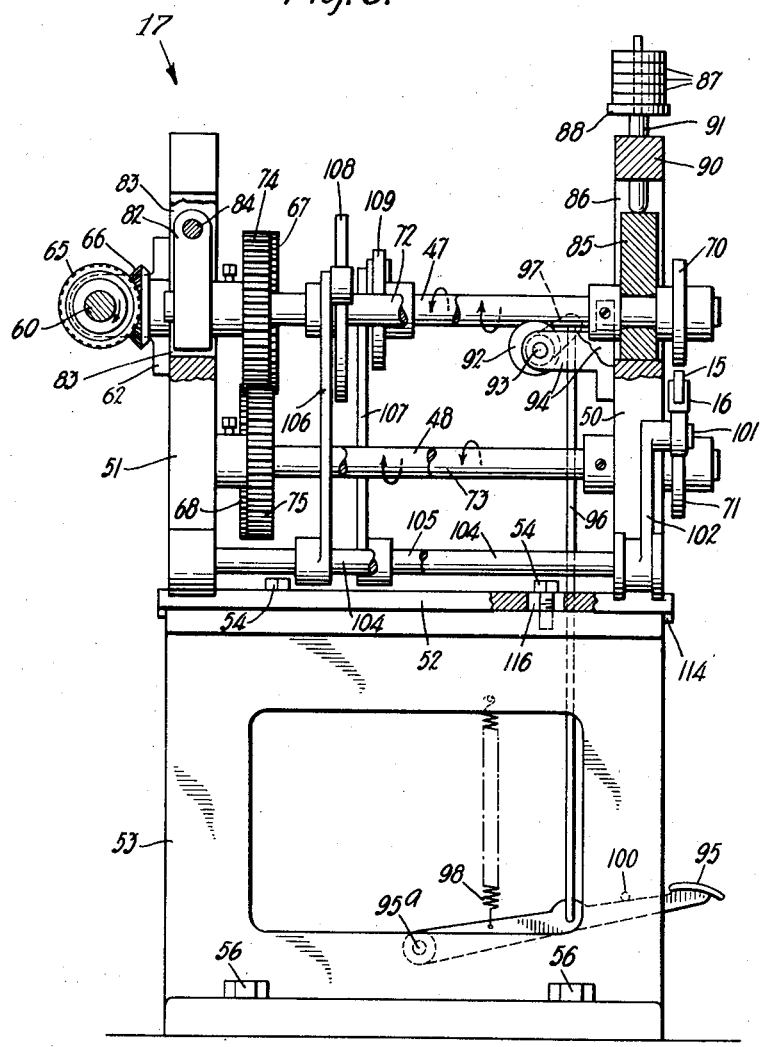

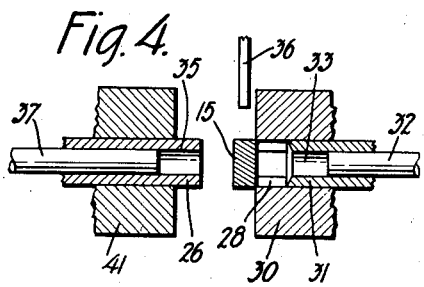
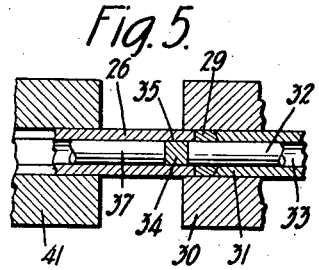
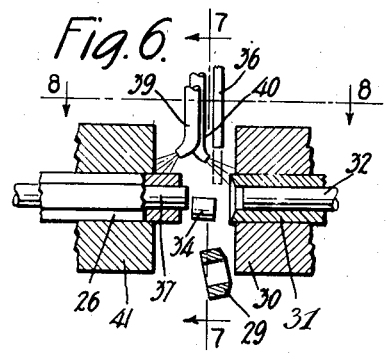
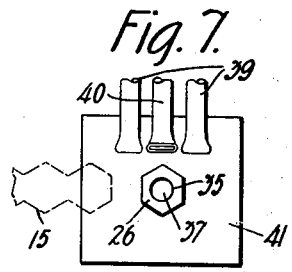
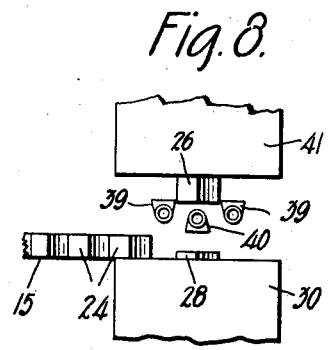
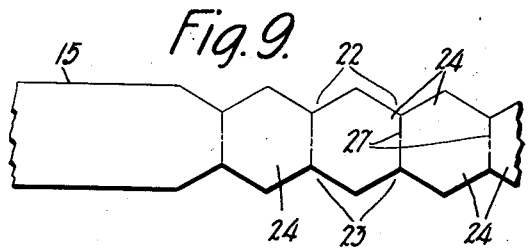
Inventor
William B. Peirce

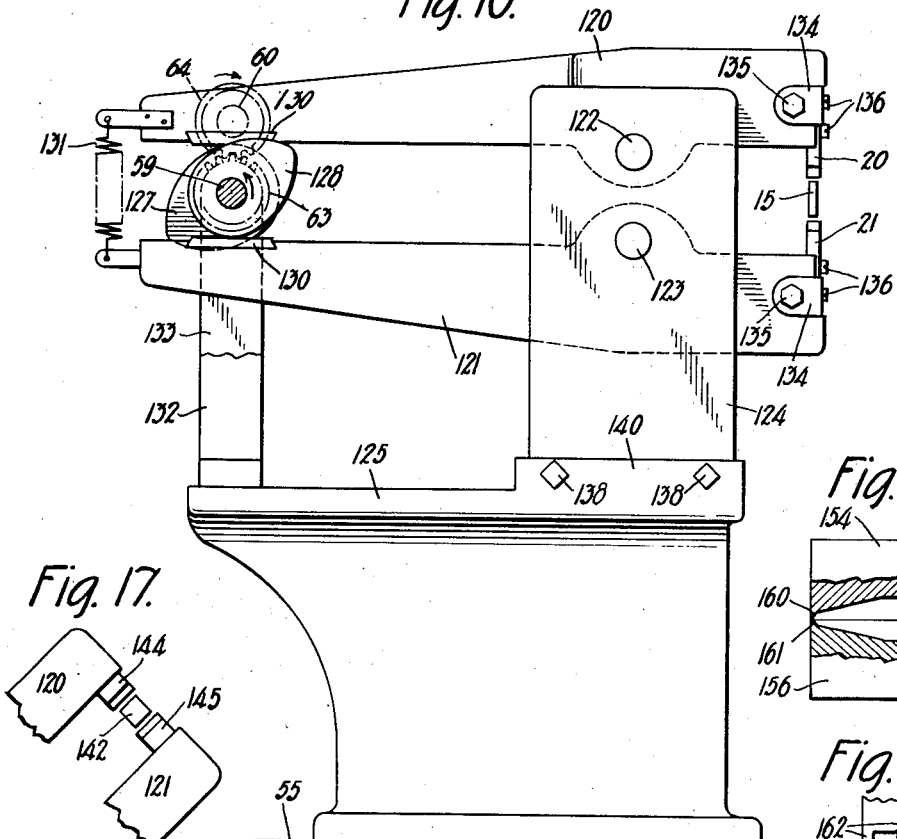

Patented July 2, 1929.

1,719,446

UNITED STATES PATENT OFFICE.

WILLIAM B. PEIRCE, OF CORAOPOLIS, PENNSYLVANIA, ASSIGNOR TO PITTSBURGH SCREW & BOLT COMPANY, OF PITTSBURGH, PENNSYLVANIA, A CORPORATION OF PENNSYLVANIA.

METAL-WORKING MACHINERY.

Application filed February 25, 1927. Serial No. 170,816.

My present invention relates to automatic machines for making metal articles such as nuts, spikes, bolts and the like. An important feature of the invention concerns automatic means for intermittently feeding lengths of the metal stock, usually bars, to the cut off or forming mechanism, particularly where hot stock is used and its heating effect on the cut off mechanism, punches, dies, etc., is likely to be serious. In such case, it is desirable to effect the intermittent forward feed steps separated by intermediate steps of withdrawal of the bar, preferably endwise, to permit application of a cooling agent, preferably a lubricating liquid arranged to discharge in operative relation to the punches and dies.

In order to properly uncover the tools and dies for application of the cooling liquid and at the same time to avoid undue cooling of the hot bar by the cooling fluid, the distance of the withdrawal should be considerable.

For the above, or any other desired purpose, my present invention provides means for automatically retracting the stock a desired, accurately predetermined distance and then feeding the same forward a distance equal to the retraction, plus the length of stock required for the next blank.

The invention also includes means for notching the opposite edges of a stock bar before it reaches the cutting-off tools, to form the opposite corners of the nut blanks so that when the blanks reach said cutting-off tools, they are sheared transversely of the bar along a single plane which forms one side face of the nut.

The feed mechanism includes two separate sets of feed rollers, one operating to advance the bar and the other to retract it. Said feed rollers are continually rotating but are provided with high spots or feeding portions, which are brought into action successively at the proper times. With this arrangement, the feed rollers are out of contact with the hot bar a substantial part of the time, so that they have opportunity to cool slightly between feeding operations.

I also provide means for reciprocating the short ends of the bars after they have passed beyond the control of feed rollers.

Other features and advantages will be more fully understood from the following description, in connection with the accompanying drawings, in which Fig. 1 is a front elevation of a machine showing the invention as applied to making nut blanks from bars;

Fig. 3 is a side elevation of the machine, partly in section;

Fig. 4 is a detailed vertical section, showing the cutting-off, piercing tool, crowning tool and knocking out mechanisms, with the parts in their normal positions;

Fig. 5 is a similar view, but shows the parts after the nut blank has been cut from the bar and is being pierced, it having been already crowned.

Fig. 6 is a similar view, but shows the parts after the nut has been knocked out, while the tools are being cooled;

Fig. 7 is a view taken on the line 7—7 of Fig. 6;

Fig. 8 is a sectional top plan view taken on the line 8—8 of Fig. 6;

Fig. 9 shows a fragment of the stock bar;

Fig. 10 is a vertical section taken on the line 10—10 of Fig. 1 and shows the notching mechanism;

Fig. 11 illustrates an application of the invention to a machine for making spikes instead of nut blanks;

Fig. 12 is a view of a spike;

Fig. 13 is a view of two dies of the spike machine;

Fig. 14 is a detail sectional view taken on the line 14—14 of Fig. 11, showing shrouded notching jaws;

Fig. 15 shows a modified form of feeding mechanism adapted for spike making;

Fig. 16 shows one arrangement of notching jaws when the bar is fed with its corner up, as in Fig. 15; and Fig. 17 shows another arrangement of the notching jaws.

Figure 1:
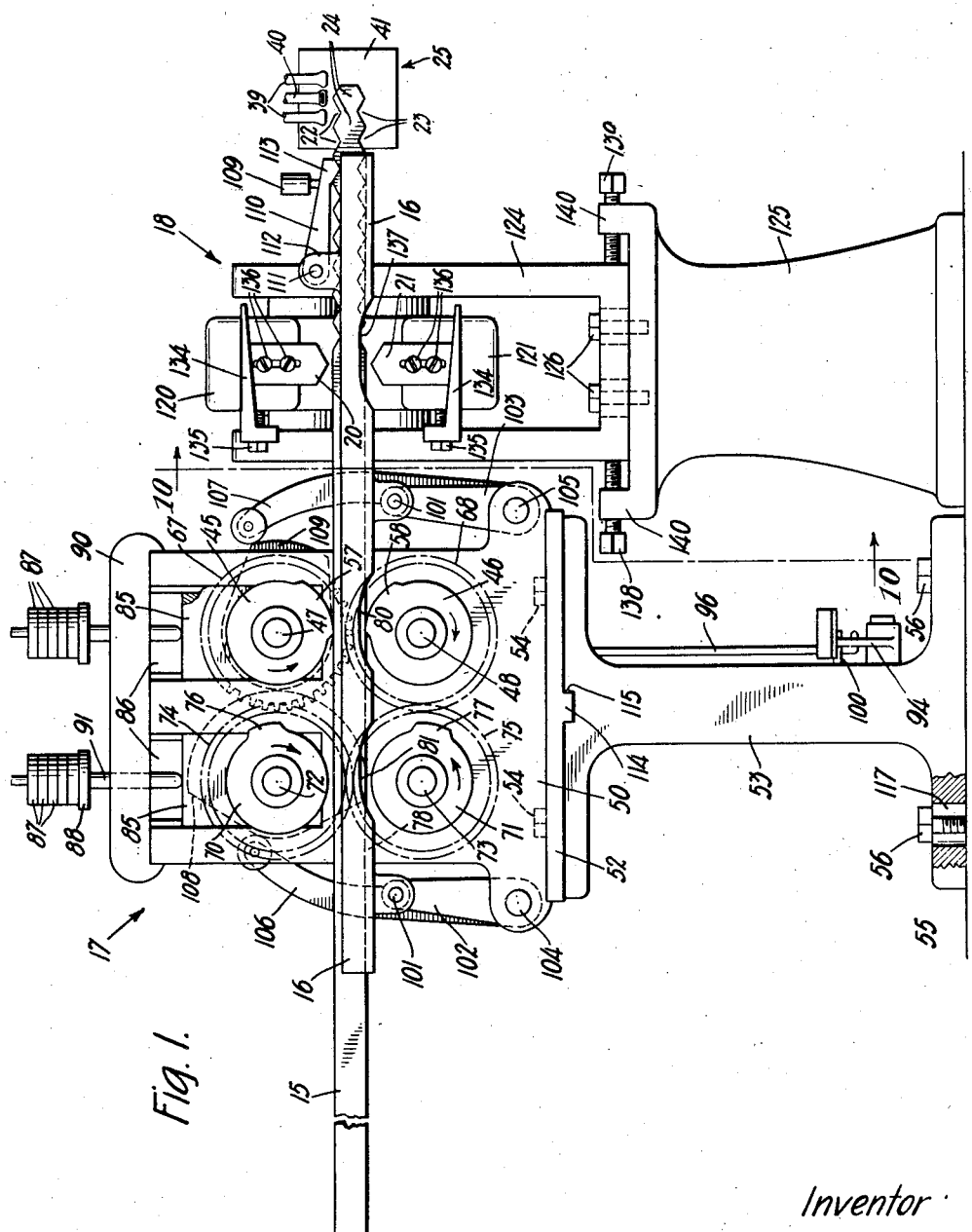

A bar, 15, of material heated to forging heat may be conducted from a furnace in any suitable manner, to a support, 16, of a feeding mechanism 17, which supplies a bar notching mechanism, 18, including jaws 20 and 21, adapted to form V-shaped notches 22 and 23, respectively, in the upper and lower narrow edges of the bar 15, to thus partially form the nut blanks, 24. The feeding mechanism also advances the stock bar 15 to suitable nut forming tools, 25, of a nut blank punching mechanism which may be of any well known construction, and of which only such parts are necessary to clearly understand the complete combination in which the invention may be included.

When a blank, 24, has been positioned, it is cut off by a punch 26, Fig. 4, along the line 27, Fig. 9, to form a plane surface which is one of the sides of a hexagonal nut blank. The punch 26, which is hexagonal in shape, forces the sheared off blank 24 into an aperture 28, Fig. 4, in a die 30, where the nut is crowned on a crowning punch 31, in the aperture 28. While held in this position by cut off punch 26, the nut blank is also pierced by a piercing punch 32, guided in an aperture 33 of the punch 31, which piercing punch forces the slug 34 into an aperture 35, in the shearing punch 26. See Fig. 5. The shearing punch 26 is then returned to normal, Fig. 6, and the nut blank 29 is pushed from the aperture 28 by the crowning punch 31. To hasten the dropping of the nut blank, which at times has a tendency to stick, there is provided an arm or kicker, 36, to strike the nut after it has been ejected from the die 30. Immediately following the dropping of the nut blank 29, the slug 34 is ejected from the aperture 35, of the shearing punch 26, by a slug ejector 37, guided in the aperture 35. It will thus be understood that hexagon nut blanks 24 are formed with flat sides vertical so that the hexagon nut may drop from the machine just as a square one would.

To cool the punches and dies there are provided nozzles 39 and 40, Figs. 6, 7 and 8, suitably supported, through which a cooling liquid agent is forced and applied to the dies and punches. The nozzles 39 direct the liquid towards the punch 26 and ejector 35 and a block 41 which supports the punch 26; the nozzle 40 directing the liquid towards the die 30 and punches 31 and 32. The stock bar 15 is backed away from the punches, by means hereinafter described, so as to expose the tools to direct impingement of the liquid discharged through said nozzles, thereby effectively cooling them. The cooling effect on the end of the bar is unimportant, because new hot material is being continuously presented.

The punches 26, 31, 32, arm 36 and ejector 37 of the nut machine may be actuated by mechanism not shown. Similarly, the means which forces the liquid from the nozzles 39 and 40 may also be operated from the actuating mechanism of the nut machine.

The feeding mechanism 17 includes rolls 45 and 46, which advance the bar 15 towards the tools 25 of the nut machine. The rolls 45 and 46 are secured to shafts 47 and 48, Figs. 1, 2 and 3, rotatively supported in uprights 50 and 51 of the machine frame. The uprights 50 and 51 are secured to a top plate 52, which is secured to a support or base, 53, by screws 54. The support 53 may rest directly on a floor 55, to which it may be secured by screws 56.

The bar advancing feed rolls 45 and 46 are mounted on shafts 47, 48 and are driven by means hereinafter described, to rotate continuously in the forward feeding direction as indicated by arrows, Fig. 1. They are located at opposite sides of the bar 15 to engage the upper and lower edges thereof, and are provided with projecting, bar-engaging segments, 57 and 58, by which the bar 15 is advanced a distance equal to the peripheral length of said segments.

Figure 2:
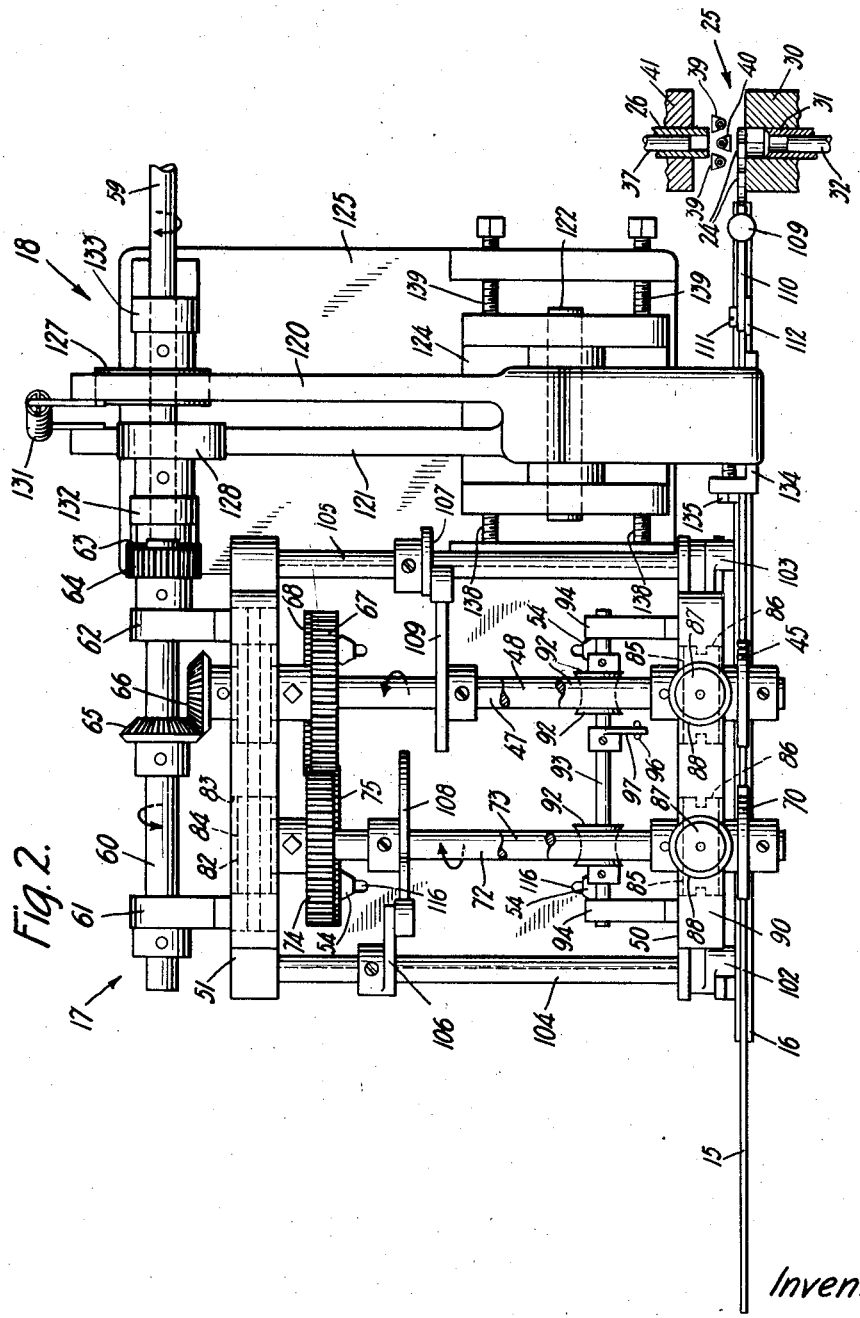
Fig. 2 is a top plan view of the machine.

To drive the feed rolls 45 and 46, there may be provided a shaft 60, Figs. 2 and 3, supported in brackets 61 and 62 on the rear upright 51 of the machine frame. The shaft 60 may be connected to be rotated by a shaft 59, which may be connected to the nut machine in a manner hereinafter described. Gears 63 and 64 (see Fig. 10 also) are secured to the shafts 59 and 60, respectively, to form a connection between them. The shaft 60 has secured thereto a bevel gear 65 meshing with a gear 66 secured to the feed roller shaft 47, Fig. 3, to rotate the latter. To the shaft 47 of roll 45, is adjustably secured a gear 67, which meshes with a similar gear 68 adjustably secured to the shaft 48 of roll 46 to rotate the latter in a direction opposite to that of roll 45.

To retract the bar 15 from the tools 25 of the nut punching mechanism, when the cooling liquid is to be applied, the feeding or bar controlling device 17 includes two retracting rolls 70 and 71, mounted on shafts 72 and 73, respectively. The retracting rolls 70 and 71, like the forward feeding rolls 46, 47, have peripheral projecting segments 76 and 77, but they rotate in the reverse direction so as to retract the stock bar, after a nut blank 24 has been sheared therefrom, so that the next blank will be out of the way while the cooling liquid is being applied to said tools.

The shaft 72 may be driven through a gear 74 thereon, which meshes with the gear 67 of the shaft 47. The shaft 73 is driven by a gear 75 secured thereto and meshes with the gears 68 and 74. It will be understood that the directions of rotation of the shafts 47, 48, 72 and 73 are such that the gears 67, 68, 74 and 75 may mesh with each other as in Fig. 1. The gears 67 and 74 are adjustably secured to the shafts 47 and 72 to properly time the rolls 45, 46 and 70, 71 with respect to each other.

The support 16 for the bar 15 is a trough-like guide, open at the top and provided with two cut-outs, 80 and 81, Fig. 1, through which the rolls 46 and 71 engage the bottom edge of the bar 15.

The two sets of rolls 45, 46 and 70, 71 permit wide latitude in designing the distances and times of the advances and retractions and of the intervals between. In general, the feeding sections, 76 and 77, of the retracting rolls are made of a length sufficient to back the bar away from the tools 25 the desired distance, and the feeding sections 57 and 58 are of a length sufficient to feed the bar 15 forward a distance equal to the retraction by the rolls 70 and 71, plus the width of a nut blank 24. The short intervals between these movements leave the bar in the advanced and retracted positions, long enough for the cut off and the cooling operations, respectively.

For each revolution of the rolls 45, 46, 70 and 71, one cycle of operation is completed. By an inspection of Fig. 1, it will be understood that the feed rolls 45 and 46 have just completed their operation. After the rolls 45 and 46 finish their operation and before the rolls 70 and 71 are brought into action, which is about ¼ of a revolution of the latter, the notching operation and the shearing operation are performed. The bar 15 is then backed away from the tools 25. The total time required to feed the bar, notch it, shear off the nut blank and pull the bar back from the tools 25 is equal to the time that it takes the rolls 45 and 46 to make not quite one-half revolution, thus leaving more than one-half revolution of the rolls 45, 46, 70. 71 to rotate idly, during which time the cooling agent is applied, it being desirable to have the liquid applied for as long a period as is possible.

To produce sufficient pressure between the feed rolls 45, 46 and the rolls 70, 71, and to compensate for varying widths of the bar 15, the shafts 47 and 72 may be supported in bearing blocks 82, Figs. 2 and 3, pivotally supported in slots 83 by a shaft 84 so that the forward ends of the shafts 47 and 72 may swing freely about the shaft 84. The forward ends of the shafts 47 and 72 are supported in bearing blocks 85, located in slots 86 of the uprights 50, which blocks are suitably guided for vertical movement in said slots. Means which may include weights 87 urges the bearing blocks 85 downwardly, said weights being detachably supported on a flange 88 of a rod 91 guided in a cross bar 90 secured to the top of the upright 50, to vary the pressure as desired on the feed rolls. Normally, the blocks 85 rest on the floors of the slots 88 and the feed rolls are clear of the bar 15. When the feeding section 57 or the section 76 of an upper roll 45 or 70 is brought into action, the block of the associated feel roll shaft is raised slightly. Thus the pressure of the weights 87 forces the upper feed roll against the bar 15 while the feeding of the bar takes place.

Provision is made to render the feed rolls ineffective so as not to interfere with the bar 15 while it is being inserted into the support 16, and while it is being adjusted to device 18. To this end, there may be located under the upper roll shafts 47 and 72, cams 92, Figs. 2 and 3, secured to a shaft 93 supported in brackets 94 on the upright 51. The cams are normally ineffective, but by rotating the shaft 93 in a clockwise direction, Fig. 3, the shafts 47 and 72 are swung about the shaft or fulcrum 84 to raise the rolls 45 and 70, out of range of the bar 15.

The cam shaft 93 may be operated by foot lever or pedal 95, pivoted at 95ᵃ on the machine frame. When said pedal is depressed, it pulls downwardly on a link 96 to rock the shaft 93 through the medium of an arm 97 secured to said shaft. A return spring 98 normally holds the pedal 95 in normal position against a stop 100.

To assist in reciprocating the bar 15, after its rear end passes beyond the feed rolls, the support 16 is floatingly supported so that it may be reciprocated, thereby reciprocating a short piece of stock bar carried by the forward end thereof. To actuate the support 16, it is pivotally connected by studs 101, Figs. 1 and 3, to upstanding arms 102 and 103 secured to shafts 104 and 105 supported in the uprights 50 and 51. The shafts 104 and 105 have also secured thereto upstanding arms 106 and 107 cooperating with cams 108 and 109 secured respectively to the shafts 72 and 47; the cam 108 being effective to actuate arm 106 and its connected parts to move the support 16 to draw the bar away from the tools; the cam 109 being effective to actuate the arm 107 and its connected parts to move the support 16 in the forward direction. The short end of the bar is positively pushed forward by the feed rolls 45 and 46 through the medium of the next succeeding bar.

To assist in causing the short stock bar 15 to follow the retraction with the trough, there is provided a detent pawl 110, pivoted at 111 on an ear 112 of the bar support 16. The free end 113 of the pawl 110 is shaped to enter the notches 22 in the upper edge of the bar 15. To hold the pawl in the notches, it is provided with a weight 109 in preference to a spring which would lose its temper due to the heat transmitted from the hot bar 15. With this arrangement it is evident that the weight 109 holds the pawl in the notch 22 non-positively, but with sufficient firmness so that the bar does not slip during the retracting movement of the support 16, while a fresh bar, which is inserted into the support 16 as soon as or before a bar being operated upon leaves the feed rolls 70, 71, positively forces the forward movement of the short end bar.

The top plate 52 is provided with a tongue 114 which extends downwardly into a groove 115 of the base 53. After the above described parts have been assembled on the top plate, they form a unit which may be slid back or forth on the base 53 to adjust said unit with reference to the jaws 20, 21 of the notching device 18. The top top plate 52 may then be secured in its adjusted position by the screws 54 which extend through elongated slots 116 in the top plate and threaded into the support 53.

To afford an adjustment of the feeding mechanism 17 towards or away from the unit punching machine, the bolts or screws 56 pass through elongated slots 117, Fig. 1, in the support or base 53.

The notching device 18, Figs. 1, 2 and 10, may include an upper lever 120 and a lower lever 121 to which are secured the notching jaws 20 and 21. The levers 120 and 121 are carried by shafts 122 and 123 supported in a U-shaped bracket 124 secured to a base 125 by screws 126, which base may rest on the floor 55 and may be secured thereto in any convenient manner.

To actuate the notching levers 120 and 121 is provided the shaft 59, which may be connected to the actuating mechanism of the nut machine at will, by a clutch (not shown). To the shaft 59 are secured two cams 127 and 128, cooperating respectively with the levers 120 and 121 to press the jaws 20 and 21 into the bar 15 to form the notches 22 and 23. By having the levers offset and the cams in parallel planes, as shown, the cams operate the levers only once per revolution of the shaft 59. The levers may be provided with hardened wear plates 130. A spring 131 connected to the two notching levers holds said levers in contact with the cams and separates the jaws 20 and 21 as the cams continue to rotate after notching the bar 15. The shaft 59 may be supported in brackets 132 and 133, secured to the base 125. By means of the above mentioned clutch, the combined feeding and notching machine may be shut down while the nut machine continues to run. Said clutch may be toothed so as to always establish the same time relation between the tools 25 and the notching device 18.

The notching or pointing jaws 20 and 21 may be adjusted up and down on the levers 120 and 121, to procure the proper depth of notches in the bar 15, by wedges 134 controlled by screws 135 and to compensate for the lengths of blanks being formed. The jaws may be secured in their adjusted positions by screws 136.

The bar support 16 extends beyond the notching mechanism 18, and it is provided in its floor with a slot 137, through which the lower jaw 21 may reach the bar 15, during an interval when these parts are stationary.

The notching jaws 20 and 21 may be adjusted to their proper position lengthwise of the bar 15, so that the leading nut blank may register with the tools of the nut machine, by set screws 138 and 139 which engage the sides of the U-shaped bracket 125, which carries the notching levers 120 and 121, the set screws being threaded through flanges 140 of the base 125. The cams 127 and 128 of the notching device are sufficiently wide to remain in cooperative relation with the levers 120 and 121 when the jaws are adjusted sidewise the relatively small distance necessary for proper registry. After the bracket has been adjusted to properly locate the jaws 20 and 21, it may be secured by the screws 126.

The edges of the bar are laterally widened by the swedging action of the jaws 20 and 21, and accordingly the channel in the support 16 may be slightly wider near its forward end to prevent jamming of this part of the bar. It will be understood that such enlargements are forced back again into the nut blank during the cut off, crowning and piercing operations.

Another application of the feeding and notching mechanism is illustrated in Fig. 11, in connection with a spike making machine 141, in which the feeding rolls engage a hot bar 142, of which spikes 142, Fig. 12, are to be formed. The feeding segments $57^a$, $58^a$ of the bar advancing rolls are long enough to feed sufficient stock to form the body 143 and the head 144 of the spike. The bar is guided by support 16 to notching jaws 144 and 145, by which notches 146 and 147 are formed in the bar, thus producing spike blanks 148. The end blanks 148 are carried by the bar through an aperture 150 in a face plate 151 supported on a frame 152 of the spike machine 141. A gauge 153 is provided to arrest the bar to assist in determining the length of the spike blank.

A shearing die 154 forces the end spike blank against a cutter 155 inserted in the face plate 151 to sever it from the bar and clamps it in stationary die 156 where it is held while the protruding end of the spike blank is bent preparatory to forming the head 144. To so bend the blank, the gauge 153 may be provided with a projection 157 which, upon the actuation of the gauge 153, to the position B, by means not shown, bends the spike blank as indicated. The gauge 153 continues in its downward movement until it is clear of a header tool 158, which is then moved horizontally against the dies 154 and 156 to form the head 144, after which the parts, gauge 153, die 154 and tool 158, return to normal. The notching jaws 144 and 145 and the shearing die 154 may be arranged to work horizontally, instead of vertically, with respect to the rolls 45, 46, 70 and 71, to act on the sides of the stock bar 142.

Instead of the die 154 moving towards the die 156 and the latter remaining stationary as above described, the two dies may be actuated to move to a central position, in alignment with the stock bar. With this arrangement, the notching jaws 144 and 145 may be designed to press the bar not quite so thin or, in other words, leave more space or material between the notches 146 and 147, the point of the spike blank being formed by inclined portions 160 and 161 of the dies 154 and 156, Fig. 13. To assist in severing the spike blank from the bar when the inclined portions 160 and 161 are employed, the retracting rolls 70 and 71 may also be used to pull the bar back away from the blank 148, the material between notches 146 and 147 being sufficient to stand the pulling strain from rolls 70 and 71.

The rolls 70 and 71 may be dispensed with when the spike blank is severed by the die 154 and the inserted cutter 155.

To prevent the lateral swelling of the bar while the notches 146 and 147 are being formed, each of the notching jaws 144 and 145 may be provided with shrouds 162 and 163, Figs. 11 and 14, designed to prevent lateral swelling at the notches 146 and 147 while they are being formed. It will be understood that the notching jaws 20 and 21 of Fig. 1 may also be provided with shrouds to prevent swelling of the bar 15 at the notches 22.

The spike bar 142 may be fed on the diamond, or in other words, with one corner up as in Fig. 15. In which case the feeding sections 57 and 58 of the feed rolls 45 and 46 are provided with square grooves 164. With this arrangement, the notching levers 120 and 121 may be provided with notching jaws 165 and 166 having inclined notch forming faces 167 and 168, as in Fig. 16. The notching levers may be tilted as in Fig. 17, to accommodate the bar 142 so that the notching jaws move at right angles to the faces to be notched. It will be understood that when the bar is fed on the diamond that the dies 154, 155, gauge 153 and header 158 are also made to accommodate this angle.

The feeding device 17 and the notching device 18, Fig. 1, are shown supported on separate bases 53 and 125. It should be understood, however, that they may readily be supported by a single base forming part of the machine frame.

While I prefer to use the retracting rolls 70 and 71, they may be dispensed with, the reciprocating support 16 alone operating to retract the bar, the forward feed being caused or assisted by the rolls 45, 46, as before.

Where the bar or rod material is supplied in a continuous length or while any bar is long enough to be under the control of the retracting rolls 70 and 71, the support may be stationary, it being necessary to actuate said support only when a bar 15 has passed beyond the control of the retracting rolls. With the present arrangement, in which the support is continually reciprocated, both movements of the bar are caused by the rolls and assisted by the support.

From the above, it will be seen that the method for which my present invention was primarily designed includes the formation of metal blanks from bar stock, the main features of which include heating and notching the stock bar by edgewise compression and upsetting of the metal at registering points along opposite edges of the bar and working the upset metal back into the blanks for formation of the completed article. The two adjacent sides of each notch form adjacent surfaces for successive blanks and the severing of the blank is in a plane connecting the deeper portions of two oppostie registering notches. In the case of the nut blanks, the two sides of each notch form sides corresponding to adjacent hexagons and the point between adjacent notches is a point corresponding to a hexagon. In this case, the severing of the successive end blanks is along a transverse plane including the nearest points of registering notches on opposite sides of a blank, each cut to form a separate blank resulting in the formation of a fifth side for the blank remaining on the end of the bar and a sixth side for the severed blank.

I claim:

1. In a feeding mechanism for controlling a bar of material from which articles are to be formed, the combination of tools to operate on the bar, continually running feed rolls to operate on said bar, engaging sections on said feed rolls to engage and feed the bar during a fraction of a revolution of the feed rolls to advance said bar intermittently to said tools and similarly arranged rolls running in the opposite direction to retract said bar after each advance.

2. In a feeding mechanism for controlling a bar of material from which articles are to be formed, the combination with intermittently acting, oppositely running feed rolls for advancing and retracting the bar and a reciprocatory support for the bar operating to assist the rolls in both directions of movement of the bar.

3. In a feeding mechanism for controlling a bar of material from which articles are to be formed, the combination of an intermittently reciprocating support for the stock bar, rolls to advance said bar intermittently along said support and other rolls to retract it during rearward movement of the support.

4. In a feeding mechanism for controlling a bar of material from which articles are to be formed, the combination of two continually running feed rolls having raised portions to alternately engage and release the bar to feed it intermittently, and a reciprocating support cooperating with said rolls.

5. In a feeding mechanism for controlling a bar of material from which articles are to be formed, the combination of two sets of continually running feed rolls, a reciprocating support to hold the bar between said rolls, raised portions on said rolls to engage opposite sides of the bar to feed it intermittently on the support, and means connecting the sets of feed rolls to cause them to act alternately.

6. In a feeding mechanism for controlling a bar of material from which articles are to be formed, the combination of two sets of continually running feed rolls, a support to hold the bar between said sets of rolls, means to drive said sets in opposite directions at the same speed, the rolls of one set having bar engaging segments longer than those of the other set, whereby the advance of said bar by said rolls is greater than the retraction by the other set of rolls.

7. The combination with tools of a metal forming machine, of feed rolls to advance a bar of material intermittently to said tools, feed rolls to retract the bar from said tools, and means to apply a cooling agent to said tools when the bar is retracted.

8. The combination with tools of a metal working machine, of means to advance a stock bar to said tools and then retract it therefrom, and means for applying a cooling agent to said tools while the stock bar is retracted.

9. The combination with tools of a metal punching machine, of feed rolls to advance a stock bar intermittently to said tools, feed rolls to intermittently retract said bar from said tools, and continually running driving means connected to all of said feed rolls.

10. The combination with tools of a metal forming and cutting off machine, of means to advance a stock bar to said tools, and then retract it therefrom, means for applying a cooling agent to said tools when the bar is retracted, and means to assist retracting the bar after the bar has passed beyond the control of the first mentioned retracting means.

11. The combination with tools of a metal forming and cutting off machine, of means to advance a stock bar to said tools, and then retract it therefrom, means for applying a cooling agent to said tools when the stock bar is in the retracted position, a support for said bar, means to actuate said support to draw the bar back from the tools after the bar has passed beyond the control of the means which ordinarily retracts it back, and a detent on said support to engage said bar to assist in retracting it.

12. In a feeding mechanism for controlling a bar of material from which articles are to be formed, the combination of a support for said bar, continuously rotating feed rolls intermittently engaging said bar to advance it along said support to the forming mechanism, and means to actuate said support to retract said bar when released by said rolls.

13. In a feeding mechanism for controlling a bar of material from which articles are to be formed, the combination of a support for said bar, feed rolls, continually running driving means for said feed rolls, tools to operate on said bar, means to cause said feed rolls to move said bar intermittently along on support to said tools, and means to actuate said support to retract said bar when released by said rolls, the support actuating means being operated by the feed roll driving means.

14. In a feeding mechanism for controlling a bar of material from which articles are to be formed, the combination of two sets of feed rolls intermittently engaging the bar, one set retracting it and the other advancing it an amount equal to the retraction plus the length used up, and means including a cam to render the said rolls inactive.

15. In a feeding mechanism for controlling a bar of material from which articles are to be formed, the combination of two pairs of feed rolls each including peripheral bar-engaging feeding sections, the pairs of feed rolls being so arranged relatively to each other that they engage the bar alternately, and means including a cam to move one roll of each pair so as to render both pairs ineffective.

Signed at Coraopolis in the county of Allegheny and State of Pennsylvania this 21st day of February, A. D. 1927.

WILLIAM B. PEIRCE.